(12) United States Patent
Okuda

(10) Patent No.: US 10,272,603 B2
(45) Date of Patent: Apr. 30, 2019

(54) METHOD FOR PRODUCING LAMINATED GLASS WITH RESIN FRAME

(71) Applicant: AGC Inc., Chiyoda-ku (JP)

(72) Inventor: Jiro Okuda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/440,486

(22) Filed: Feb. 23, 2017

(65) Prior Publication Data

US 2017/0246779 A1  Aug. 31, 2017

(30) Foreign Application Priority Data

Feb. 26, 2016 (JP) .................................. 2016-036083

(51) Int. Cl.
| | | |
|---|---|---|
| *B29C 45/14* | (2006.01) | |
| *B32B 17/06* | (2006.01) | |
| *B32B 17/10* | (2006.01) | |
| *B29K 709/08* | (2006.01) | |
| *B29L 31/30* | (2006.01) | |
| *B29L 31/00* | (2006.01) | |

(52) U.S. Cl.
CPC .. *B29C 45/14434* (2013.01); *B29C 45/14418* (2013.01); *B29C 45/14836* (2013.01); *B32B 17/064* (2013.01); *B32B 17/10761* (2013.01); *B29K 2709/08* (2013.01); *B29L 2031/30* (2013.01); *B29L 2031/3052* (2013.01); *B29L 2031/778* (2013.01); *B32B 2605/006* (2013.01)

(58) Field of Classification Search
None
See application file for complete search history.

(56) References Cited

U.S. PATENT DOCUMENTS 2,137,472 A * 11/1938 Forbes .................... B29C 43/18
   264/275
4,584,155 A * 4/1986 Zanella ............... B29C 33/0044
   264/252

(Continued)

FOREIGN PATENT DOCUMENTS

| DE | 100 21 808 A1 | 10/2001 |
| FR | 2 600 933 A1 | 1/1988 |
| JP | 2009-269381 | 11/2009 |

OTHER PUBLICATIONS

Extended European Search Report dated Jul. 4, 2017 in Patent Application No. 17000300.8.

*Primary Examiner* — Edmund H Lee
(74) *Attorney, Agent, or Firm* — Oblon, McClelland, Maier & Neustadt, L.L.P.

(57) ABSTRACT

A method for producing a laminated glass with a resin frame includes a disposing step of disposing a laminated glass inside a shaping mold in which a cavity into which a resin material for a resin frame is injected is formed, an injection step of injecting the resin material into the cavity from a first surface side of the laminated glass or an end face side of the laminated glass, a blocking step of blocking a flow of the resin material in at least a part of a peripheral portion of the laminated glass to prevent the resin material from reaching an outer peripheral region on a second surface opposite to the first surface, and an opposing force applying step of applying an opposing force from an opposing force applying position on the second surface and inside of the outer peripheral region of the laminated glass.

13 Claims, 7 Drawing Sheets

(56) References Cited

U.S. PATENT DOCUMENTS

| | | | | |
|---|---|---|---|---|
| 4,662,113 A * | 5/1987 | Weaver | B29C 45/14377 | 49/404 |
| 4,688,752 A * | 8/1987 | Barteck | B29C 33/0044 | 249/85 |
| 4,732,553 A * | 3/1988 | Hofer | B29C 70/763 | 249/83 |
| 4,762,481 A * | 8/1988 | Weaver | B29C 45/14377 | 425/116 |
| 4,795,667 A * | 1/1989 | Armstrong | B29C 33/0044 | 249/95 |
| 4,854,599 A * | 8/1989 | Barteck | B29C 33/0044 | 277/650 |
| 4,915,395 A * | 4/1990 | Barteck | B29C 33/0044 | 249/95 |
| 5,061,429 A * | 10/1991 | Yoshihara | B29C 33/0044 | 264/252 |
| 5,454,706 A * | 10/1995 | Midorikawa | B29C 45/14418 | 249/91 |
| 5,916,600 A * | 6/1999 | Dubay | B29C 33/0044 | 264/252 |
| 6,123,535 A * | 9/2000 | Ash | B29C 33/0044 | 425/125 |
| 6,461,137 B1 * | 10/2002 | Ash | B29C 33/0044 | 264/252 |
| 7,871,555 B2 * | 1/2011 | Orten | B29C 45/14418 | 264/165 |
| 8,119,048 B2 * | 2/2012 | Nishimura | B29C 45/14073 | 264/252 |
| 8,790,562 B2 * | 7/2014 | Sitterlet | B29C 45/14377 | 264/252 |
| 8,992,209 B2 | 3/2015 | Nakata et al. | | |
| 2011/0031647 A1 | 2/2011 | Nakata et al. | | |

\* cited by examiner

METHOD FOR PRODUCING LAMINATED GLASS WITH RESIN FRAME

CROSS-REFERENCE TO RELATED APPLICATIONS

This application claims priority from Japanese Patent Application No. 2016-036083 filed on Feb. 26, 2016, the entire subject matter of which is incorporated herein by reference.

BACKGROUND OF THE INVENTION

Technical Field

The present invention relates to a method for producing a laminated glass with a resin frame for use in a window of a vehicle or the like, and a laminated glass with a resin frame.

Background Art

It has been known that a resin frame is formed on a peripheral portion of a laminated glass (see Patent Literature 1).

Patent Literature 1 discloses a method for producing a glass with a frame in which a ratio (w1+w2+w3)/w4 of a total w1+w2+w3 of a width w1 of a cavity for a frame in an interior-side glass surface, a width w2 of a communication hole and a width w3 of an auxiliary cavity to a width w4 of a cavity for a frame to be formed in an exterior-side glass surface is from 0.5 to 1.5. In this method, a load applied to a peripheral portion of a plate glass during injection molding can be reduced and the plate glass can be prevented from being damaged when a frame is integrally formed on the plate glass by injection molding.

Patent Literature 1: JP-A-2009-269381

BRIEF SUMMARY OF THE INVENTION

In Patent Literature 1, a frame is formed on an end face of a glass and peripheral portions of opposite surfaces of a glass. However, in recent years, it has been required from a point of view of design that a resin frame is provided in only one surface (for example, an indoor side of a vehicle) of a glass or only one surface and an end face of the glass. In this case, it can be considered that a surface of a mold is configured in contact with a glass surface (referred to as a second surface) where a frame will not be provided, so that no cavity can be formed in the second surface. However, it is physically (due to limited accuracy in machining) difficult to form the mold so that a surface of the mold can contact with the second surface with no gap. Therefore, some gap is always formed between the surface of the mold and the second surface. As a result, there is a problem that, due to a force applied to a peripheral portion of a glass when a resin is injected, chipping or the like may occur in the glass.

The present invention provides a method for producing a laminated glass with a resin frame, and a laminated glass with a resin frame, in which occurrence of chipping or the like in the laminated glass is suppressed.

A method for producing a laminated glass with a resin frame according to the present invention includes a disposing step of disposing a laminated glass inside a shaping mold in which a cavity into which a resin material for a resin frame is injected is formed, an injection step of injecting the resin material into the cavity from a first surface side of the laminated glass or an end face side of the laminated glass, a blocking step of blocking a flow of the resin material in at least a part of a peripheral portion of the laminated glass to prevent the resin material from reaching an outer peripheral region on a second surface opposite to the first surface and an opposing force applying step of applying an opposing force from an opposing force applying position on the second surface and inside of the outer peripheral region of the laminated glass, wherein the opposing force applies to suppress pressure applied to the laminated glass in the injection step.

A laminated glass with a resin frame according to the present invention includes a laminated glass including a first glass plate, a second glass plate and an intermediate layer disposed between the first glass plate and the second glass plate, and a resin frame placed on at least a part of an outer peripheral portion of the laminated glass. The laminated glass has a first surface, and a second surface opposite to the first surface. The resin frame has a removal trace on the same plane as the second surface.

According to the present invention, pressure which is applied from a first surface side to a second surface side of a laminated glass during molding is suppressed in an injection step, to thereby prevent chipping or the like in the laminated glass.

BRIEF DESCRIPTION OF THE DRAWINGS

FIG. 1A is a front perspective view and FIG. 1B is a sectional view taken on line A-A in FIG. 1A.

FIG. 2A is a front perspective view during molding, FIG. 2B is a sectional view taken on line B-B in FIG. 2A, and FIG. 2C is a front perspective view after the molding.

FIG. 4A is a front perspective view during molding, FIG. 4B is a sectional view taken on line C-C in FIG. 4A, and FIG. 4C is a front perspective view after the molding.

FIG. 5A is a front perspective view during molding, FIG. 5B is a sectional view taken on line D-D in FIG. 5B, and FIG. 5C is a back perspective view after the molding.

FIG. 6A is a front perspective view, FIG. 6B is a sectional view taken on line E-E in FIG. 6A according to the third embodiment, and FIG. 6C is a sectional view taken on line E-E in FIG. 6A according to the fourth embodiment.

FIG. 7A is a view showing an attachment in Example 1, and FIG. 7B is a view showing an attachment in Example 2.

DETAILED DESCRIPTION OF THE INVENTION

Specific embodiments of a laminated glass with a resin frame according to the present invention will be described below in detail with reference to the drawings.

Figure 1A:
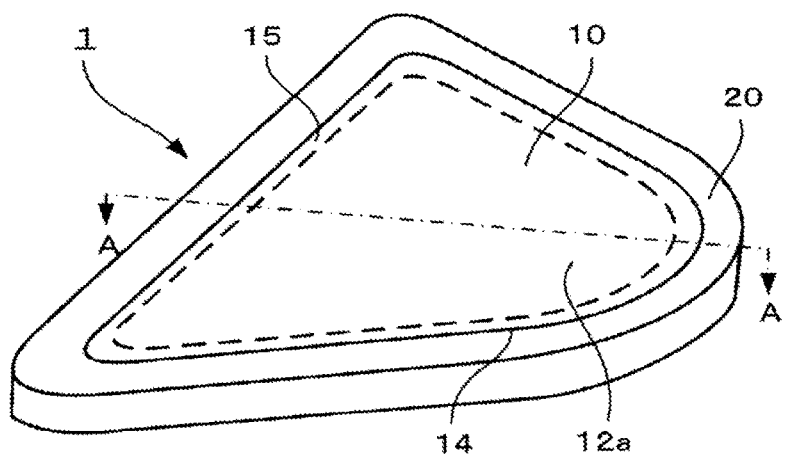
FIG. 1A and FIG. 1B show an example of a laminated glass with a resin frame according to the present invention.
Figure 1B:
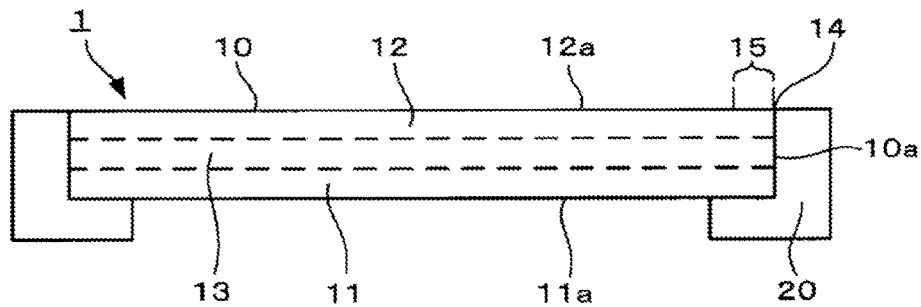

FIG. 1A and FIG. 1B show a laminated glass with a resin frame. FIG. 1A is a front perspective view, and FIG. 1B is a sectional view taken on line A-A in FIG. 1A. An example of the laminated glass with a resin frame will be described with reference to FIG. 1A and FIG. 1B.

In the embodiment, a laminated glass 1 with a resin frame is an example which is, for example, chiefly attached to a triangular window for a rear door of a vehicle such as a car. Thus, the laminated glass 1 with a resin frame has a substantially triangular shape in a front view. The laminated glass 1 with a resin frame includes a laminated glass 10, and a resin frame 20 integrally formed in a peripheral portion of the laminated glass 10. Incidentally, the triangular window for the rear door is merely an example. The embodiment is not limited to such an application. In addition, in the laminated glass 1 with a resin frame according to the embodiment, from a point of view of more excellent design, the resin frame 20 is provided in at least one surface of the laminated glass 10 to meet a demand to make a body of a vehicle (particularly a luxury car or the like), the laminated glass (window glass) 10 and the resin frame 20 flush with one another.

The laminated glass 10 has a first glass plate 11, a second glass plate 12, and an intermediate layer 13 disposed between the first glass plate 11 and the second glass plate 12. A surface of the first glass plate 11 is defined as a first surface 11a, a surface of the second glass plate 12 on the opposite side to the first surface 11a is defined as a second surface 12a, an outer periphery of the laminated glass 10 is defined as an end face 10a, a part where the end face 10a and the second surface 12a abut on each other is defined as a boundary ridge line 14, and a region from the boundary ridge line 14 to a slightly inner part on the second surface 12a is defined as an outer peripheral region 15. In the laminated glass with a resin frame according to the embodiment, the resin frame 20 is formed to continuously cover the end face 10a of the laminated glass 10 and a part of the first surface 11a near the end face 10a.

The laminated glass 10 is manufactured in a known float process. In the float process, a molten glass material is launched on molten metal such as tin, and a plate glass with uniform thickness and uniform plate width is molded by an exact temperature operation.

An example of a composition of the first glass plate 11 and the second glass plate 12 for use in the embodiment includes a glass composition containing, as represented by mole percentage based on oxides, from 50 to 80% of $SiO_2$, from 0 to 10% of $B_2O_3$, from 0.1 to 25% of $Al_2O_3$, from 3 to 30% of $Li_2O+Na_2O+K_2O$, from 0 to 25% of MgO, from 0 to 25% of CaO, from 0 to 5% of SrO, from 0 to 5% of BaO, from 0 to 5% of $ZrO_2$, and from 0 to 5% of $SnO_2$. However, the composition is not limited to the example especially.

The intermediate layer 13 may have a composition which is in general use in a conventional laminated glass for a vehicle. For example, polyvinylbutyral (PVB), ethylene-vinyl acetate (EVA), etc. may be used. Use may be made of a thermosetting resin which is liquid before heating. Namely, the intermediate layer 13 may be in a liquid state or the like before the first glass plate 11 and the second glass plate 12 are bonded to each other, so long as the intermediate layer 13 is in a layer state after the laminated glass 10 is configured.

Figure 2A:
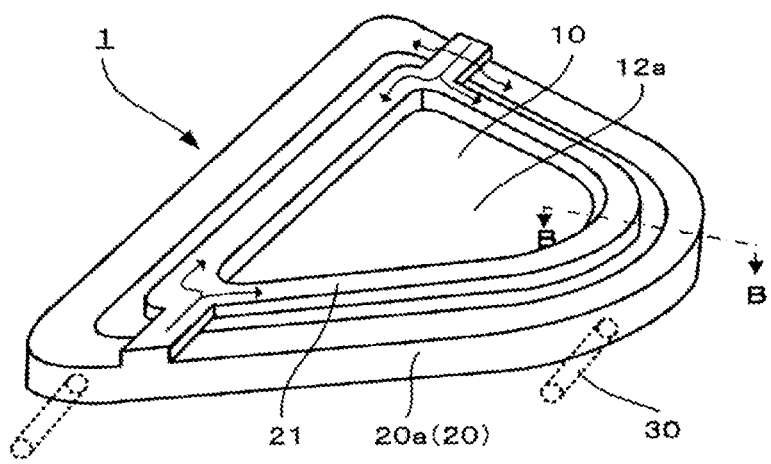
FIG. 2A to FIG. 2C show an example of a first embodiment of a method for producing the laminated glass with a resin frame according to the present invention.
Figure 2B:
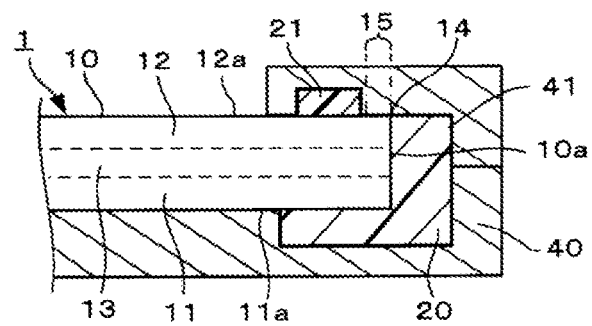
Figure 2C:
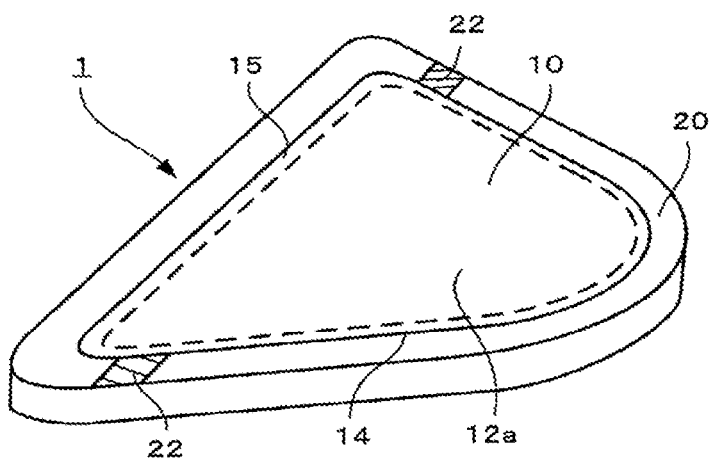

Each embodiment of the method for producing the laminated glass 1 with a resin frame will be described in detail with reference to FIG. 2A to FIG. 6C. FIG. 2A to FIG. 2C show an example of a first embodiment of the method for producing a laminated glass with a resin frame. FIG. 2A is a front perspective view, FIG. 2B is a sectional view taken on line B-B in FIG. 2A, and FIG. 2C is a front perspective view showing the laminated glass 1 with a resin frame. Incidentally, Example 1 of the laminated glass 1 with a resin frame includes a first embodiment and a second embodiment described later.

In the first embodiment, a resin is molded on the second surface 12a of the second glass plate 12 at the same time as the resin frame 20 is integrally formed on the laminated glass 10. The resin frame 20 is defined as a first molding element 20a, and the resin to be molded on the second surface 12a is defined as a second molding element 21. The first molding element 20a and the second molding element 21 are concurrently molded from a plurality of gates 30. In FIG. 2A, resin flows of the first molding element 20a and the second molding element 21 are illustrated by allows. The gates 30 may be provided on the first surface side or the side surface side.

Molding is performed in the following procedure.

(1) Disposing Step: First, the laminated glass 10 is disposed inside a shaping metal mold (referred to as a shaping mold) 40. A cavity 41 having a concave shape for forming the resin frame 20 is formed in the shaping mold 40.

(2) Injection Step: Next, a resin material is injected from the first surface 11a side of the laminated glass 10 in the cavity 41 through the gates 30, so as to form the resin frame 20 covering a peripheral portion of the first surface 11a near the end face 10a. That is, the resin frame 20 is formed to cover the first surface 11a and the end face 10a continuously.

(3) Blocking Step: In at least a part of the peripheral portion of the laminated glass 10, a flow of the resin material is blocked to prevent the resin material from reaching an outer peripheral region 15 on a second surface 12a opposite to the first surface 11a. In the first embodiment, the flow of the resin material is blocked by the shaping mold in contact with the outer peripheral region 15. Here, the outer peripheral region 15 designates a region with a fixed width within the second surface including the boundary ridge line 14 where the end face 10a and the second surface 12a abut on each other. Incidentally, the flow of the resin material may be blocked in a periphery of the laminated glass 10 to be prevented from reaching the outer peripheral region 15 on the second surface 12a opposite to the first surface 11a.

(4) Opposing force Applying Step: In the first embodiment, the second molding element 21 is formed at the same time as the injection step. The second molding element 21 is formed on a position (hereinafter also referred to as an opposing force applying position) inside the outer peripheral region 15 of the laminated glass 10, thereby applying an opposing force which applies to suppress pressure applied to the laminated glass 10 in the injection step (2).

Due to this step, a force is prevented from applying to the peripheral portion of the laminated glass 10, thereby suppressing occurrence of chipping or the like in the laminated glass 10. In the background art, when there is a slight gap between the second surface 12a of the second glass plate 12 and the cavity 41 of the shaping mold 40, there is a risk that the laminated glass 10 may be damaged due to molding pressure for forming the resin frame 20. However, due to this step, occurrence of a gap is suppressed and damage is less likely to occur. In addition, a so-called nick, that is, chipping like a semi-elliptic shape is apt to occur particularly in a part inside the second surface from the boundary ridge line 14 in the background art. Such a nick can be suppressed.

In addition, when the resin material is injected from the first surface 11a side, the laminated glass 10 is hardly bent like a cantilever from the first surface to the second surface. Therefore, a load is hardly applied to the peripheral portion and damage can be suppressed.

In addition, in the embodiment of FIG. 2A to FIG. 2C, a part of the resin material injected passes through the outer peripheral region on the second surface 12a and reaches the opposing force applying position of the second surface 12a. Thus, the opposing force is applied to the part of the resin material. The part of the resin material is cooled as it is. When a resin material similar to that of the first surface is used for the second surface, chipping or the like in the laminated glass 1 with a resin frame is prevented during cooling of the shaping mold 40. This can be considered that a difference in stress between front and back surfaces of the laminated glass 1 with a resin frame can be reduced due to a difference in thermal shrinkage between glasses and the resin material during the cooling.

In addition, the embodiment of FIG. 2A to FIG. 2C includes the following step.

(5) Removal Step (Cutting Step): After the laminated glass 1 with a resin frame is extracted from the shaping mold 40, the second molding element 21 is removed. In the first embodiment, the second molding element 21 formed on the resin frame 20 is cut on the same plane as the second surface 12a. Thus, a removal trace 22 is left behind on the resin frame 20.

The removal trace 22 is a surface having a different texture from the surface of the resin frame 20 molded normally. Specifically, it is desired that a surface roughness in the removal trace 22 is at least 1.5 times or more preferably at least twice as high as a surface roughness in the surface of the resin frame 20 molded normally. The surface roughness is measured by a surface roughness tester (SURFCOM 120A, manufactured by Tokyo Seimitsu Co., Ltd). When the surface roughness was measured actually, a surface roughness Ra in the surface of the resin frame 20 was 0.64 µm, while a surface roughness Ra in a part of the removal trace 22 was 1.32 µm. Thus, there appeared a difference in texture.

As a result, the removal trace 22 can be used as various marks. For example, when a glass is installed, a robot or a worker can determine a direction or position of the laminated glass 10 based on a position of the removal trace 22. Incidentally, the phrase "on the same plane as the second surface" may allow some displacement between the second surface 12a and a surface where the removal trace 22 is formed, as long as an effect of the removal trace 22 is not lost.

In addition, when the second molding element 21 formed on the resin frame 20 is removed, the second molding element 21 may be left behind to protrude from the same plane as the second surface, as long as the second surface is not covered with the second molding element 21. On that occasion, the removal trace 22 may be a surface perpendicular to the second surface. In this manner, a part of the second molding element 21 and/or the removal trace 22 can be also used as an engagement part for installation for a vehicle body 50.

Figure 3:
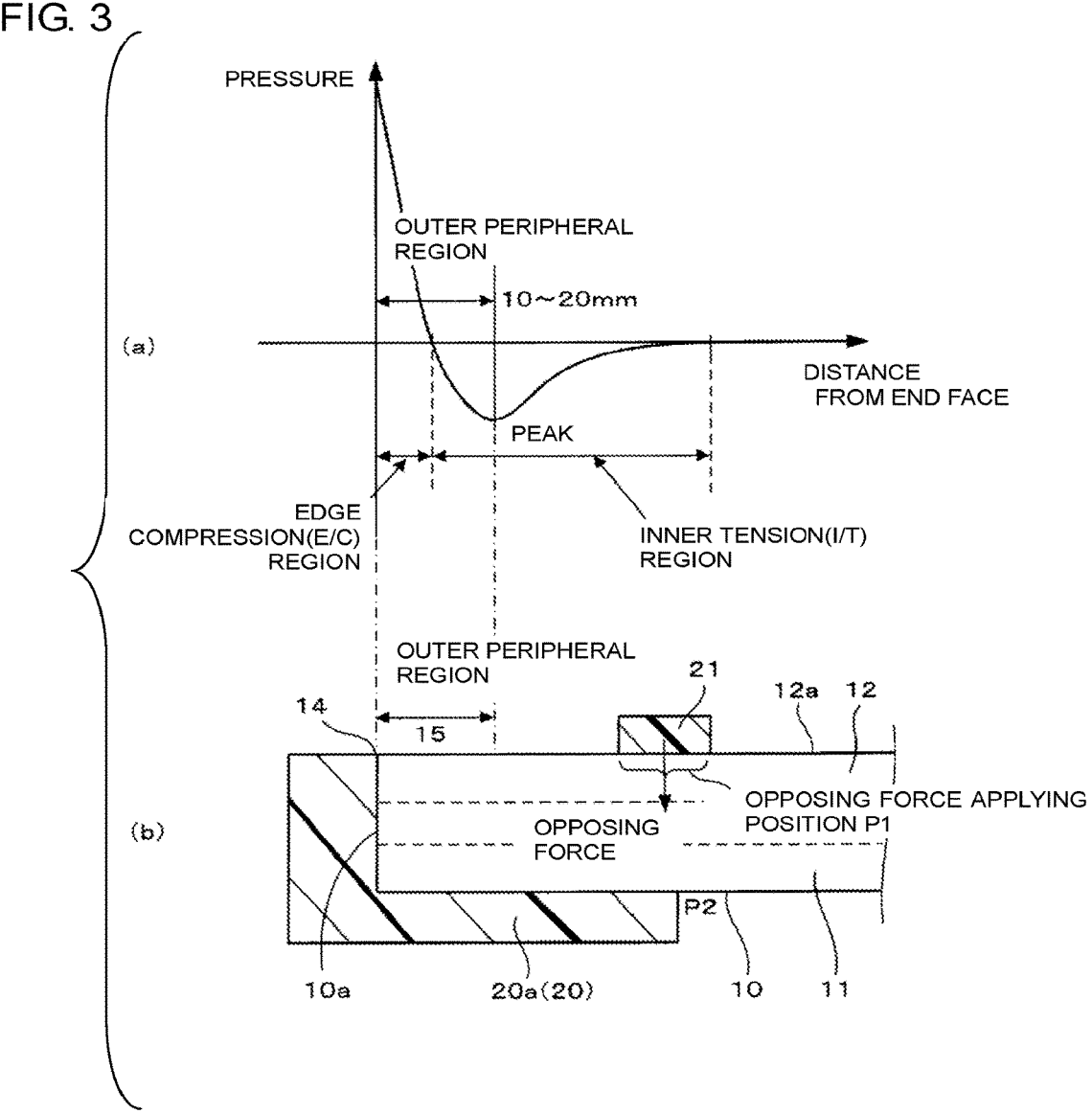
FIG. 3 shows schematic views for explaining an opposing force to be applied during a production process and an outer peripheral region according to the present invention. The graph (a) of FIG. 3 is a graph of tensile stress, and the graph (b) of FIG. 3 is a view showing a relationship between the laminated glass with a resin frame and the graph (a) in FIG. 3.

FIG. 3 shows schematic views for explaining an opposing force to be applied and an outer peripheral region. The graph (a) of FIG. 3 is a graph of an integrated value of tensile stress in a plate thickness direction in a single glass plate constituting the laminated glass 10. The graph (b) of FIG. 3 shows a relationship between the laminated glass 1 with a resin frame and the graph. The opposing force to be applied will be described with reference to FIG. 3.

As shown in the graph (a) in FIG. 3, edge compression (E/C) (compression stress) stays behind within a predetermined distance from an end face of a glass plate constituting the laminated glass 10 because cooling during molding starts at an edge thereof. Further, inner tension (I/T) (tensile stress) stays behind in a region inside the glass plate due to reaction of the E/C. Therefore, in the laminated glass 10 in which such two glass plates have been laminated, it is preferable that a peak position of the I/T (typically 10 to 20 mm from the end face of the glass plate) is within the outer peripheral region 15. The laminated glass 10 may be easily damaged at the peak position of I/T. Therefore, when the peak position of the I/T is located in a region where the resin material is not provided, damage can be reduced. Thus, as shown in the graph (b) of FIG. 3, an opposing force applying position P1 which is a position where an opposing force is applied to the second surface 12a of the laminated glass 10 is preferably located inside a position within the second surface, the position having a peak position of inner tension in a glass plate including the second surface of the laminated glass. That is, the opposing force applying position P1 is preferably located at least 20 mm inside from the end face of the laminated glass 10 within the second surface. Thus, it is possible to reduce such a fear that damage may occur due to the opposing force applied to the peak position of the I/T.

Incidentally, in FIG. 2A to FIG. 2C, an entire region of the opposing force applying position P1 on the second surface is located outside an innermost position P2 of the resin material within a surface on the first surface 11a side. However, as shown in the graph (b) of FIG. 3, a part of a region of the opposing force applying position P1 on the second surface may be located inside an innermost position P2 of the resin material within a surface on the first surface 11a side. Due to this configuration, the opposing force applying position can be kept away from the peak position of the I/T. Thus, it is possible to apply the opposing force while reducing damage.

Figure 4A:
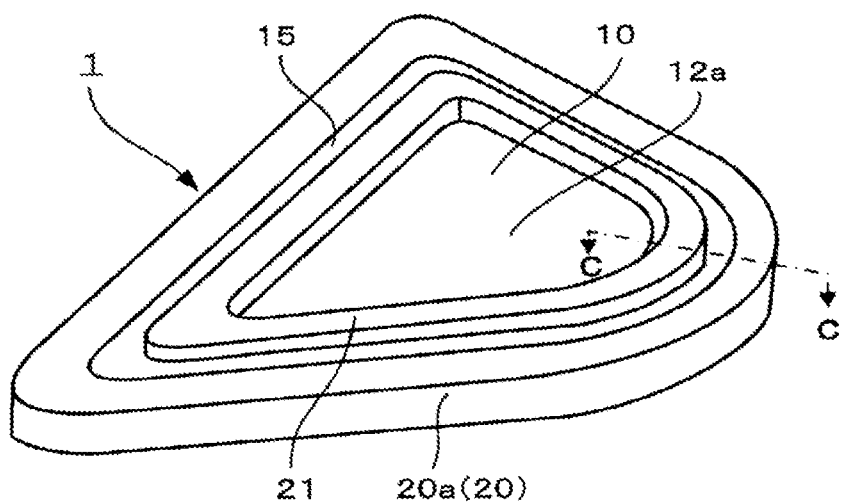
FIG. 4A to FIG. 4C show an example of a second embodiment of a method for producing the laminated glass with a resin frame according to the present invention.
Figure 4B:
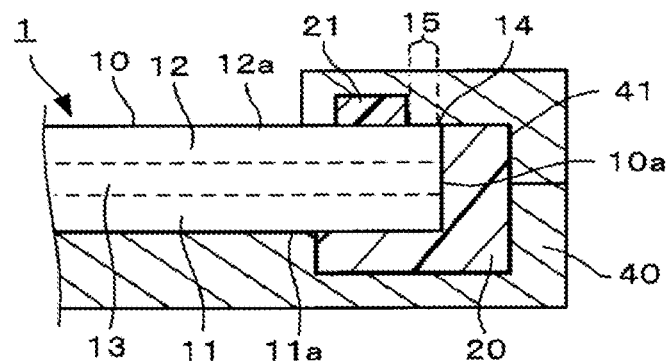
Figure 4C:
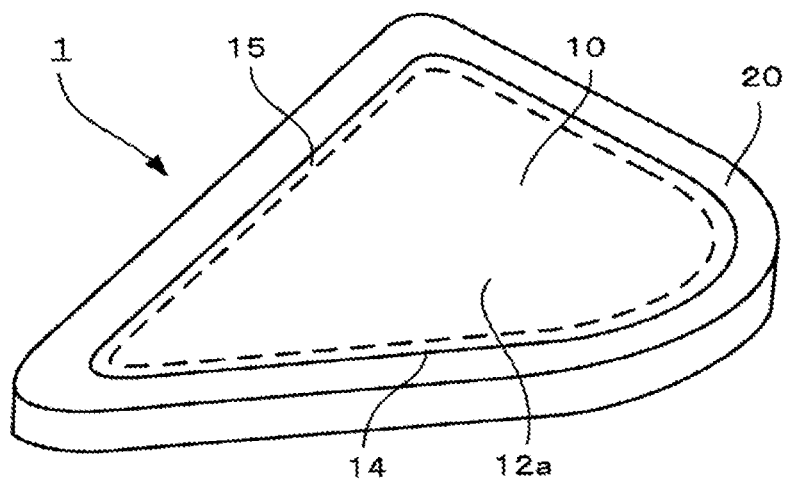

FIG. 4A to FIG. 4C show an example of a second embodiment of the method for producing the laminated glass 1 with a resin frame. FIG. 4A is a front perspective view during molding. FIG. 4B is a sectional view taken on line C-C in FIG. 4A. FIG. 4C is a front perspective view after the molding. The second embodiment of the method for producing the laminated glass 1 with a resin frame will be described with reference to FIG. 4A to FIG. 4C.

In the second embodiment, the removal step (5) in the first embodiment is omitted. Other steps are similar to those in the first embodiment. In the second embodiment, the second molding element 21 is formed on a position inside the end face 10a of the laminated glass 10 and at a distance from the end face 10a. In the injection step (2), the cavity 41 of the shaping mold 40 abuts on the second surface 12a near the end face 10a to prevent the resin material for the resin frame 20 as a first molding element from getting over the end face 10a and reaching the second surface 12a.

Various materials may be used for the second molding element 21 as long as an opposing force can be applied. A resin material for the second molding element 21 may be the same as or different from the resin material forming the resin frame 20. Fluid or liquid such as water may be used. Thus, it is possible to extend a range of choices as the material for the second molding element 21. In addition, the second molding element 21 can be separated easily from the second surface 12a after solidification. Therefore, the removal step (5) of cutting the second molding element 21 from the resin frame 20 in the first embodiment is not required. Since the removal step (5) can be omitted, it is possible to reduce the cost or shorten the manufacturing time.

Figure 5A:
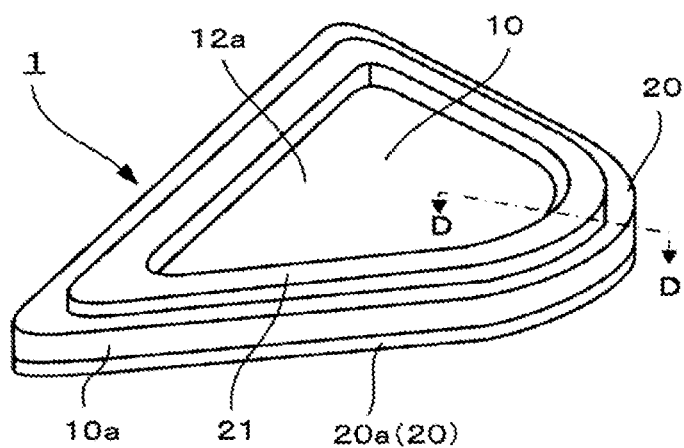
FIG. 5A to FIG. 5C show an example of the second embodiment of the method for producing the laminated glass with a resin frame according to the present invention.
Figure 5B:
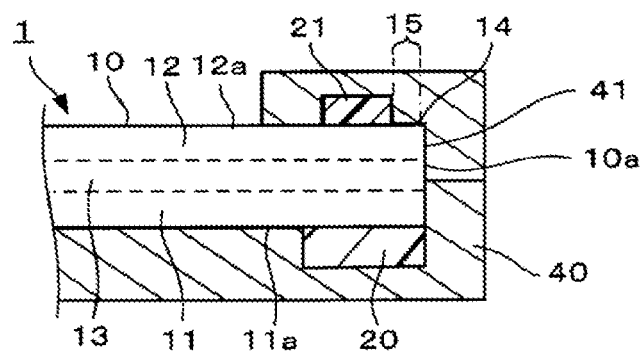
Figure 5C:
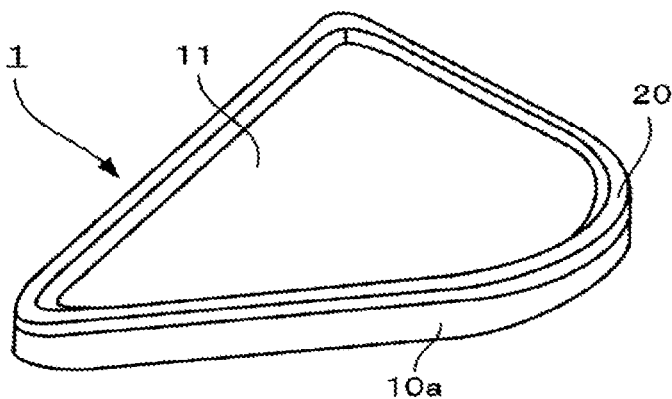

FIG. 5A to FIG. 5C show Example 2 of the laminated glass 1 with a resin frame. FIG. 5A is a front perspective view during molding. FIG. 5B is a sectional view taken on line D-D in FIG. 5A. FIG. 5C is a back perspective view after the molding. The resin frame 20 in the laminated glass 1 with a resin frame according to the first embodiment and the second embodiment has been described as Example 1, in which the resin frame 20 has a form covering the first surface 11a and the end face 10a. However, the resin frame 20 may be formed only on the first surface 11a (Example 2) as shown in FIG. 5A to FIG. 5C. In addition, the production method in Example 2 is the same as that in the first embodiment or the second embodiment, except that the resin frame 20 is formed only on the first surface 11a.

Figure 6A:
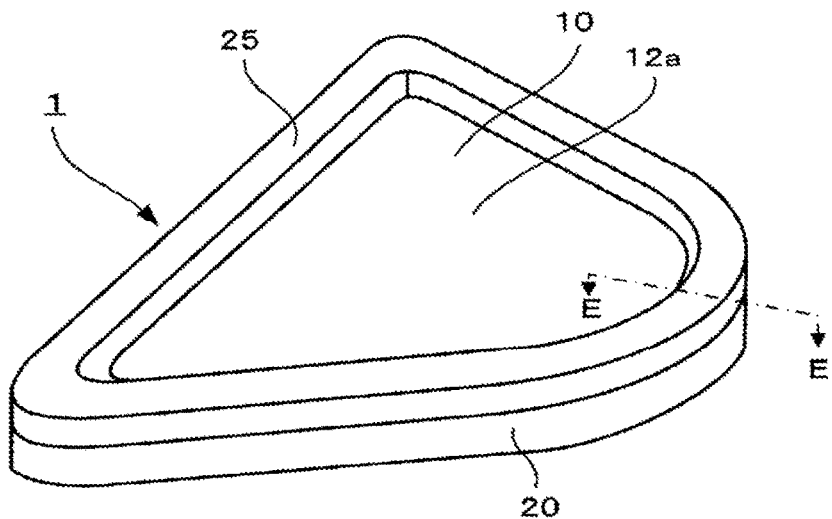
FIG. 6A to FIG. 6C show examples of a third embodiment and fourth embodiment according to the present invention.

A third embodiment (FIG. 6B) and a fourth embodiment (FIG. 6C) of the method for producing the laminated glass 1 with a resin frame will be described with reference to FIG. 6A to FIG. 6C.

The production method according to the third embodiment will be described below.

(1) Disposing Step: The laminated glass 10 is disposed inside the shaping mold 40. The cavity 41 of the shaping mold 40 is formed to enclose the end face 10a of the laminated glass 10. After the laminated glass 10 is disposed inside the shaping mold 40, an opposing force applying member 25 is disposed on a periphery of the second surface 12a near the end face 10a and at least on the outer peripheral region 15. The opposing force applying member 25 also serves for preventing the resin material forming the resin frame 20 from getting over the end face 10a and reaching the second surface 12a during molding.

Figure 6B:
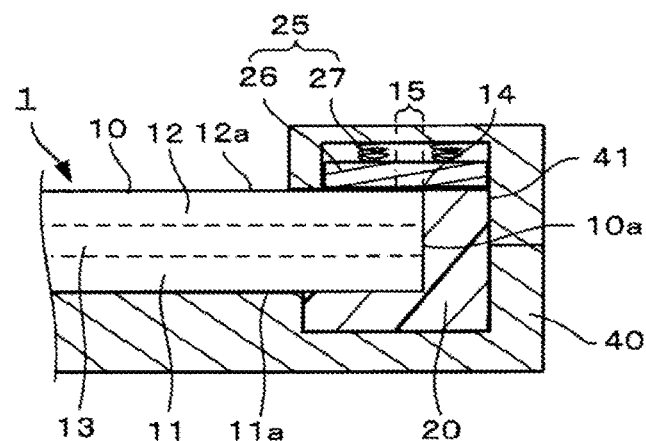

In the third embodiment, the opposing force applying member 25 includes a rigid body 26 having a predetermined rigidity, and an elastic body 27 such as a spring capable of absorbing pressure applied to the rigid body 26 (see FIG. 6B).

(2) Injection Step: Next, a resin material is injected from the first surface 11a side of the laminated glass 10 in the cavity 41 through the gates 30, so as to form the resin frame 20 covering a peripheral portion of the first surface 11a near the end face 10a. That is, the resin frame 20 is formed to cover the first surface 11a and the end face 10a continuously. In the injection step (2), the blocking step (3) and the opposing force applying step (4) are performed concurrently.

(3) Blocking Step: In at least a part of the peripheral portion of the laminated glass 10, a flow of the resin material is blocked to prevent the resin material from reaching an outer peripheral region 15 on a second surface 12a opposite to the first surface 11a. In the third embodiment, the flow of the resin material is blocked by the opposing force applying member 25 in contact with the outer peripheral region 15.

(4) Opposing force Applying Step: The opposing force applying member 25 applies an opposing force from the second surface 12a to suppress pressure occurring in a process in which the resin frame 20 is formed. In this step, chipping of the laminated glass 10 is prevented. Simultaneously, the opposing force applying member 25 prevents the resin material forming the resin frame 20 from reaching the second surface 12a. That is, the opposing force applying member 25 is disposed in tight contact with the second surface 12a in the cavity 41 on the second surface 12a side and so as to protrude from the end face 10a with the same width as a width with which the resin frame 20 protrudes from the end face 10a.

Figure 6C:
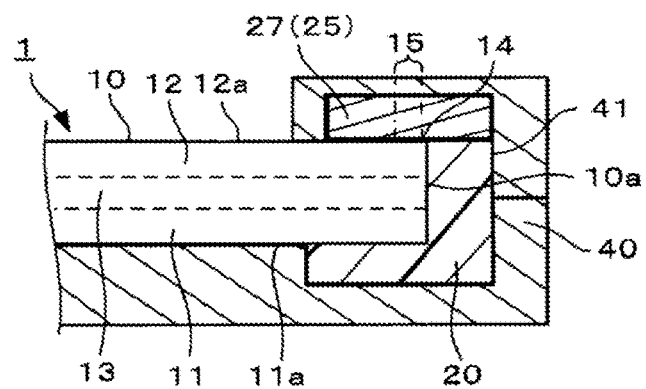

The production method according to the fourth embodiment is similar to that according to the third embodiment, except that the opposing force applying member 25 includes only an elastic body 27 such as rubber (see FIG. 6C). In the injection step (2) (opposing force applying step (4)), the elastic body 27 absorbs pressure applied to the opposing force applying member 25. Here, the elastic modulus of the elastic body 27 is higher than that of the resin material and lower than that of a material of the shaping mold. In addition, although the third embodiment and the fourth embodiment have been described along Example 1 of the laminated glass 1 with a resin frame, these embodiments can be described along Example 2 in a similar way.

Figure 7A:
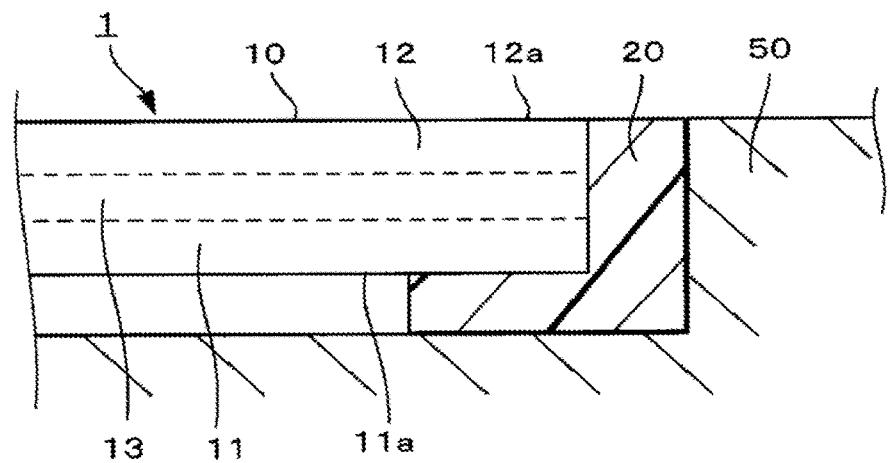
FIG. 7A and FIG. 7B show sectional views each showing a state in which a laminated glass with a resin frame according to the present invention has been attached to a body of a vehicle.
Figure 7B:
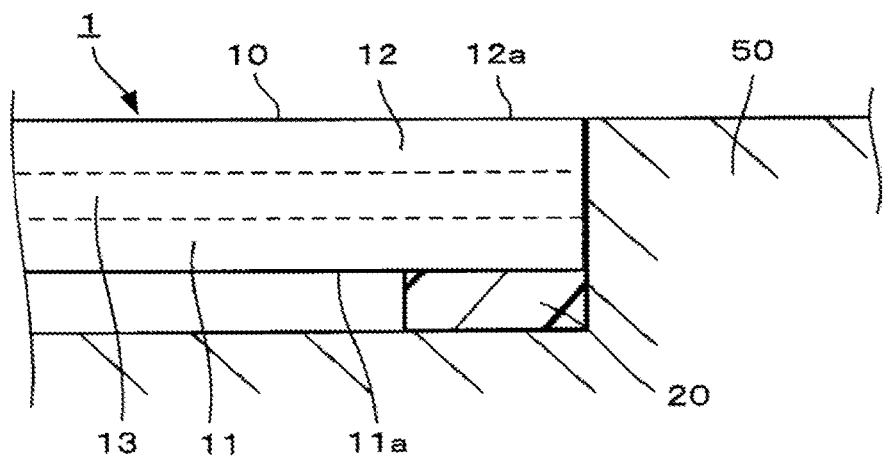

FIG. 7A and FIG. 7B are sectional views each showing a state in which the laminated glass 1 with a resin frame has been attached to a vehicle body 50. FIG. 7A shows a state where the laminated glass 1 with a resin frame according to Example 1 has been attached. FIG. 7B shows a state where the laminated glass 1 with a resin frame according to Example 2 has been attached. In Example 1, the second surface 12a of the laminated glass 1 with a resin frame, the resin frame 20, and the vehicle body 50 are arranged substantially on the same plane. In Example 2, the second surface 12a of the laminated glass 1 with a resin frame, and the vehicle body 50 are arranged substantially on the same plane. Thus, superior design can be obtained. The state where the laminated glass 1 with a resin frame is arranged can be changed suitably in accordance with its application.

Incidentally, when the laminated glass 1 with a resin frame according to Example 1 or 2 of the present invention is attached to the vehicle body 50, a section shown in FIG. 7A or FIG. 7B does not have to be formed in a periphery of the laminated glass 1 with a resin frame. That is, a part of a peripheral portion of the laminated glass 1 with a resin frame may have configuration covering the first surface 11a, the second surface 12a and the end face 10a with the vehicle body. The removal trace 22 may be provided in a part which is covered with the vehicle body. In addition, the removal trace 22 may be also used as a mark or an engagement part when the laminated glass 1 with a resin frame is installed on the vehicle body 50.

Although the resin material is injected from the first surface 11a side of the laminated glass 10 in the injection step (2) in the description of the embodiments above, it may be understood that the resin material is injected from the first surface 11a side of the laminated glass 10 or the end face 10a side of the laminated glass 10 because the first surface 11a and the end face 10a are continuous to each other.

The present invention should not be construed as being limited to the embodiments described above, and modifications, improvements, etc. can be suitably made therein. Materials, shapes, dimensions, numerical values, configurations, numbers, positions, etc. of each constituent element in each of the embodiments described above are at will and not limited so long as the present invention can be achieved.

INDUSTRIAL APPLICABILITY

A laminated glass with a resin frame according to the present invention is suitably used for a window or the like of a vehicle (particularly a luxury vehicle) in which a body, the laminated glass and the resin frame are made flush with one another from a point of view of design.

DESCRIPTION OF REFERENCE NUMERALS AND SIGNS 1 laminated glass with resin frame
10 laminated glass (window glass)
10a end face
11 first glass plate
11a first surface
12 second glass plate
12a second surface
13 intermediate layer
14 boundary ridge line
15 outer peripheral region
20 resin frame
20a first molding element
21 second molding element
22 removal trace
25 opposing force applying member
26 rigid body
27 elastic body
30 gates
40 shaping mold (shaping metal mold)
41 cavity
50 body

The invention claimed is:

1. A method for producing a laminated glass with a resin frame, comprising:
disposing a laminated glass inside a shaping mold forming a cavity into which a first molding material may be injected;
injecting the first molding material into the cavity from a first surface side of the laminated glass or an end face side of the laminated glass;
blocking a flow of the first molding material in at least a part of a peripheral portion of the laminated glass to prevent the first molding material from reaching an outer peripheral region on a second surface opposite to the first surface;
applying an opposing force from an opposing force applying position on the second surface and inside of the outer peripheral region of the laminated glass to suppress pressure applied to the laminated glass while injecting the first molding material into the cavity by injecting a second molding material from a second surface side of the laminated glass toward the opposing force applying position to form a second molding element on the second surface; and
separating the second molding element from the second surface after solidification;
wherein the first molding material and the second molding material are resin materials that may be the same or different.

2. The method for producing a laminated glass with a resin frame according to claim 1, wherein:
a peak position of inner tension in a glass plate including the second surface of the laminated glass is located within the outer peripheral region.

3. The method for producing a laminated glass with a resin frame according to claim 1, wherein:
the opposing force applying position is located inside a position within the second surface, the position having a peak position of inner tension in a glass plate including the second surface of the laminated glass.

4. The method for producing a laminated glass with a resin frame according to claim 1, wherein:
the opposing force applying position is located at least 20 mm inside from the end face of the laminated glass.

5. The method for producing a laminated glass with a resin frame according to claim 1, wherein:
a part of the opposing force applying position on the second surface is located inside an innermost position of the resin material within a surface on the first surface side.

6. The method for producing a laminated glass with a resin frame according to claim 1, wherein:
the first molding material forms the resin frame covering the first surface and the end face continuously.

7. The method for producing a laminated glass with a resin frame according to claim 1, wherein the second molding element is formed on a position inside the end face of the laminated glass and at a distance from the end face.

8. The method for producing a laminated glass with a resin frame according to claim 1, wherein the second molding element does not come in contact with the first molding element.

9. The method for producing a laminated glass with a resin frame according to claim 1, wherein separating the second molding element from the second surface after solidification results in formation of a removal trace.

10. The method for producing a laminated glass with a resin frame according to claim 1, wherein injecting the first molding material into the cavity comprises injecting the first molding material into the cavity from the first surface side of the laminated glass.

11. The method for producing a laminated glass with a resin frame according to claim 1, wherein injecting the first molding material into the cavity comprises injecting the first molding material into the cavity from the end face side of the laminated glass.

12. The method for producing a laminated glass with a resin frame according to claim 1, wherein the first molding material and the second molding material are the same resin materials.

13. The method for producing a laminated glass with a resin frame according to claim 1, wherein the first molding material and the second molding material are resin materials that are different.

* * * * *